United States Patent Office 2,811,545
Patented Oct. 29, 1957

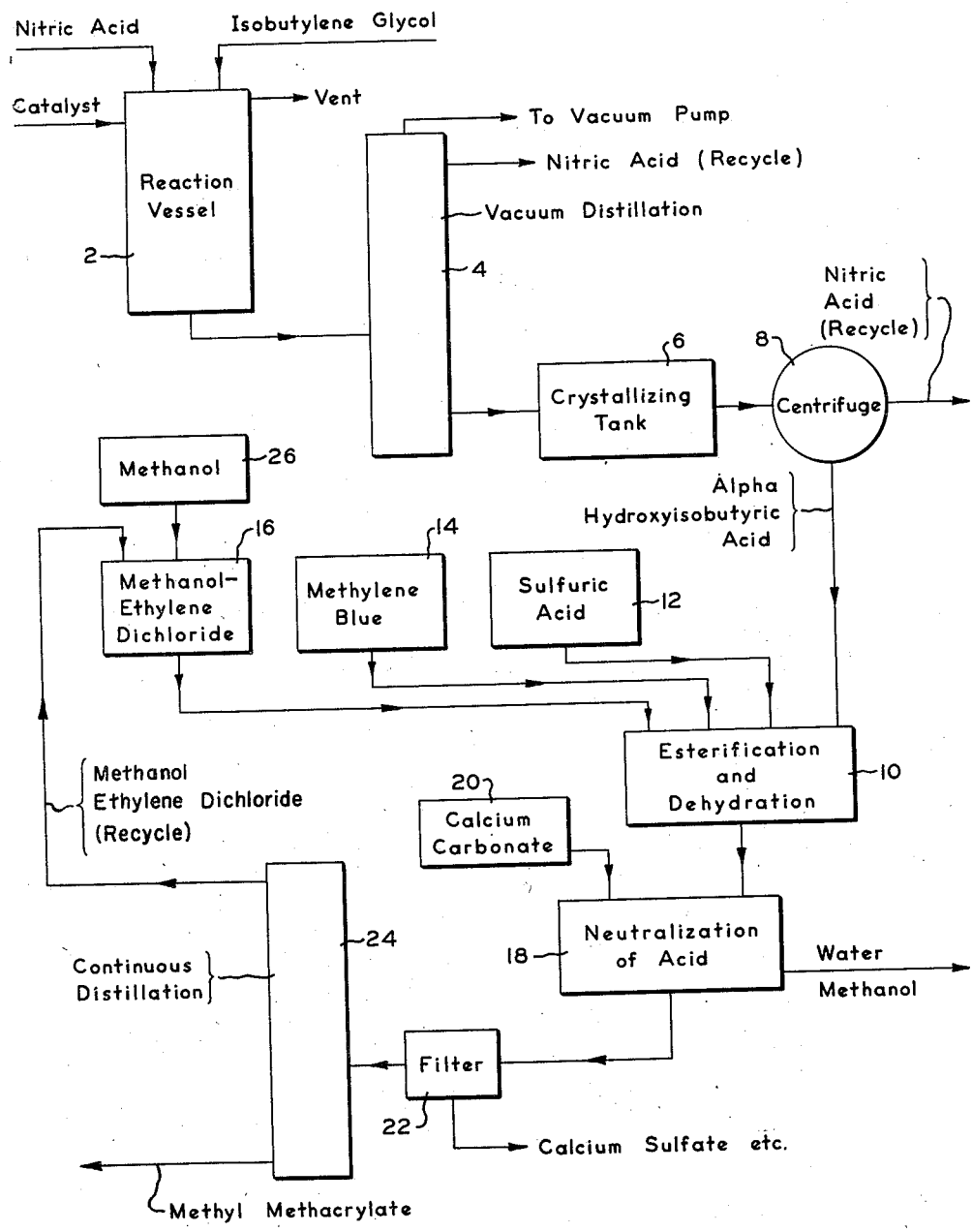

2,811,545

PRODUCTION OF α-HYDROXY ISOBUTYRIC AND METHACRYLIC ACIDS AND THEIR ESTERS

Thomas R. Steadman, Waban, Mass., assignor to Escambia Chemical Corporation, Pace, Fla., a corporation of Delaware Continuation of application Serial No. 353,848, May 8, 1953. This application July 23, 1956, Serial No. 599,473

9 Claims. (Cl. 260—486)

This invention relates to improved processes for the production of valuable chemicals from constituents of natural gas.

A principal object of the present invention is to provide an economical, integrated process for making methacrylic acid and esters thereof from constituents of natural gas such as isobutane.

Another object of the invention is to provide an improved process for the production of the valuable intermediate compound alpha hydroxyisobutyric acid.

Still another object of the invention is to provide an improved process for oxidizing isobutylene glycol to alpha hydroxyisobutyric acid.

Other objects of the invention will in part be obvious and will in part appear hereinafter.

The invention accordingly comprises the process involving the several steps and the order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing which is a flow sheet illustrating one preferred embodiment of the present invention.

Methacrylic acid and its esters, such as the ethyl and methyl methacrylates, are very valuable chemicals which have found wide utility in the plastics industry. The production of these chemicals has in the past involved relatively complex procedures and has required the use of relatively expensive starting materials. In the present invention constituents of natural gas, such as isobutane, may be utilized as the starting material. As explained in the copending application of Robertson et al., Serial No. 316,158, filed October 22, 1952, it is economically possible to oxidize isobutane to obtain high yields of isobutylene glycol.

The present invention is particularly directed to the conversion of isobutylene glycol to methacrylic acid or esters thereof. A particular aspect of the present invention is directed to the selective oxidation of isobutylene glycol so that only the primary hydroxyl group thereof is converted to the carboxyl group. In one preferred embodiment of the invention the isobutylene glycol is oxidized by means of nitric acid to alpha hydroxyisobutyric acid which is subsequently converted to methacrylic acid or suitable esters thereof.

The reaction between the isobutylene glycol and the nitric acid preferably takes place with at least a stoichiometric amount of the nitric acid necessary to selectively oxidize the primary hydroxyl group of the isobutylene glycol. This reaction is preferably carried out at a relatively low temperature. The oxidation preferably takes place in the presence of a small amount of a suitable catalyst.

Referring now to the drawing, there is illustrated a flow sheet which embodies one method of practicing the present invention. In the flow sheet there is shown an oxidation reactor 2. The preferred quantities of isobutylene glycol and nitric acid are fed to the reactor 2 from suitable supply means. A small quantity of a catalyst, such as ammonium meta vanadate, is also preferably added to the reaction mixture to contribute to the smoother oxidation and thus increase the safety of the process. Upon completion of the controlled nitric acid oxidation of isobutylene glycol to alpha hydroxyisobutyric acid, the reaction mixture is drained into a vacuum distillation still 4 and any nitric acid present is distilled off. The recovered nitric acid is recycled back to a suitable storage means.

The reaction mixture, substantially free of nitric acid is run into a crystallizing tank 6 wherein alpha hydroxyisobutyric acid is crystallized out. The alpha hydroxyisobutyric acid crystals and its mother liquor are drained into a centrifuge 8 and separated. Any remaining nitric acid in the mother liquors may be recovered and recycled back to a suitable storage means. If desired, a suitable purifying means may be employed for processing all the nitric acid recovered prior to returning it to storage.

The alpha hydroxyisobutyric acid is fed to an esterification and dehydration reactor 10. Sufficient quantities of sulfuric acid and an alcohol-solvent mixture (e. g., ethylene dichloride-methanol) from supply sources 12 and 16 respectively are added to the alpha hydroxyisobutyric acid so as to simultaneously esterify and dehydrate the acid to methyl methacrylate. The esterification and dehydration is carried out in the presence of a small quantity of methylene blue (or any other suitable polymerization inhibitor) supplied from source 14 so as to prevent polymerization. The resulting acidic solution of methyl methacrylate is then neutralized at 18 with a calcium carbonate solution from supply 20. The neutralized mixture is then passed through filter 22 to remove any insoluble materials such as calcium sulfate. The filtrate is run into a continuous distillation still 24 wherein the various components of the filtrate are separated. The solvent ethylene dichloride and unreacted methanol are recovered and returned to the solvent-alcohol storage tank 16. The alcohol (e. g., methanol) content in the solvent-alcohol storage 16 is maintained at a predetermined concentration so that methanol lost due to the esterification is continuously replaced from a supply indicated at 26.

The methyl methacrylate recovered from the distillation still may be led to suitable storage tanks or to suitable purifying means.

Specific detailed methods of practicing the present invention are set forth in the following nonlimiting examples which are directed more specifically to the step of oxidizing the isobutylene glycol to alpha hydroxyisobutyric acid.

*Example I.*—30 mls. of 70 percent nitric acid and 0.10 gram of ammonium meta vanadate catalyst were charged to a reaction vessel, the ammonium meta vanadate being converted to vanadium pentoxide by the nitric acid. 9.76 grams of isobutylene glycol were added dropwise to this mixture and the temperature of the reaction mixture was maintained at between 25° to 30° C. by means of a water bath. The reaction was initiated by heating a few drops of the isobutylene glycol in nitric acid until nitrogen dioxide fumes evolved and then adding the fuming drops to the stirred reaction mixture. The stirring was continued for about an additional 30 minutes, after which time the reaction mixture was allowed to stand for 18 hours at room temperature (25° C.). The resulting mixture was diluted with water and distilled in a vacuum to remove the water and nitric acid. To the residue was added 50 ml. of a saturated solution of potassium carbonate. The resulting mixture was extracted with normal butanol to remove any unreacted glycol. The aqueous solution was acidified to a pH of 1 with hydrochloric acid and extracted for 24 hours with ether. The ether was then evaporated from the extract on a steam bath and the residue was dissolved in benzene and freed of water by azeotropic distillation. The dry benzene solution was evaporated to a small volume, cooled, and a crop of crystals of alpha hydroxyisobutyric acid amounting to 3.36 grams resulted. The yield of alpha hydroxyisobutyric acid was thus 29.9 percent of the theoretical, based on the original quantity of isobutylene glycol charged to the reactor. A small quantity of unreacted isobutylene glycol was also recovered.

*Example II.*—Isobutylene glycol was oxidized under conditions similar to those described in Example I except for the fact that the reaction mixture was allowed to react for a period of 24 hours at a temperature of substantially 0° C. with no preheating of the reaction mixture. However, in this case 5 mls. of dinitrogen tetroxide were charged to the reaction vessel along with the other materials. A yield of 28.2 percent of alpha hydroxyisobutyric acid was obtained.

*Example III.*—To a well-stirred mixture of 60 ml. of 70% nitric acid, 5 ml. of dinitrogen tetroxide, and a few milligrams of vanadium pentoxide was added 18 grams of isobutylene glycol over a period of 40 minutes. The temperature of the reaction mixture was maintained at 25°–30° C. This mixture was allowed to stand at 25° C. for sixteen hours and then heated in a water bath at 100° C. for 30 minutes. The excess nitric acid and other volatile materials were removed by distillation in vacuo. The residual material, when crystallized twice from benzene, gave 6.66 grams of crystalline alpha hydroxyisobutyric acid, corresponding to a yield of 32.1%. The mother liquors on analysis with sodium bismuthate were shown to contain 0.75 gram more of the product, increasing the yield of a total of 35.8%.

*Example IV.*—9.76 grams of isobutylene glycol were added dropwise to 45 ml. of 50 percent nitric and 0.10 gram of ammonium meta vanadate catalyst in a reaction vessel. The reaction mixture was heated for one hour at a temperature maintained between 50° to 55° C. and then allowed to stand for 18 hours at room temperature (25° C.). A similar work-up of the reaction mixture was employed as in Example I. A yield of 24.5 percent of alpha hydroxyisobutyric acid was obtained.

The oxidation of isobutylene glycol will take place when at least the stoichiometric amount of nitric acid required for the reaction is present. However, better results have been obtained when the nitric acid is present in excess over the stoichiometric amount needed to selectively oxidize the primary alcohol group. Aqueous nitric acid solutions with a concentration of from 50 to 70 percent have been found to be preferable, the yield increasing with the concentration of the nitric acid.

The oxidation may be initiated either by adding a little dinitrogen tetroxide ($N_2O_4$) at the start of the reaction, or by heating a small portion of the reaction mixture itself so as to reduce the nitric acid sufficiently to form a little dinitrogen tetroxide. When used in the specification and claims, the expressions dinitrogen tetroxide ($N_2O_4$) and nitrogen dioxide ($NO_2$) are considered to be equivalent.

The reaction is preferably carried out at a temperature in the range of from 0° C. to 35° C., although somewhat higher temperatures may be used. The time of reaction may be varied so that, for example, very much shorter periods than those given in the examples are satisfactory.

The oxidation should be carried out in the presence of a catalyst so as to assure a smooth reaction. Operation without the use of a catalyst is apt to be quite hazardous. Small quantities of ammonium meta vanadate or vanadium pentoxide, when added to the oxidation reaction, have been found to be satisfactory as catalysts. Other suitable catalysts are mixtures containing dissolved copper salts and dissolved vanadium or manganese salts. Similarly, other catalysts such as iodine or boron trifluoride may be employed.

Upon completion of the oxidation, the resulting mixture is distilled under reduced pressure to remove water and excess nitric acid. The subsequent extraction of the desired acid from the residue may be done by any of the well-known chemical procedures.

In connection with the specific flow sheet illustrated in the drawing, it should be pointed out that numerous modifications may be made in the various techniques employed without departing from the scope of the invention. For example, if methacrylic acid is the desired end product rather than the methacrylate, the esterification step is eliminated and the alpha hydroxyisobutyric acid is simply dehydrated to methacrylic acid by heating it in the presence of a suitable strong mineral acid such as sulfuric or phosphoric acids.

Equally, many esters of methacrylic acid other than the methyl esters may be made by utilizing a different alcohol. Examples of such suitable alcohols are the aliphatic alcohols ethyl, propyl, butyl, etc. In a similar manner, the specific reagent employed in the various neutralization and reaction steps may be replaced by numerous equivalent chemicals. For example, the ethylene dichloride solvent can be replaced by numerous other solvents such as methylene dichloride, carbon tetrachloride and similar low boiling halogenated hydrocarbons. Other suitable acids and bases may be used in place of the specific reagents ($H_2SO_4$ and $CaCO_3$) employed in the illustrated flow sheet. In like manner many other polymerization inhibitors such as hydroquinone or para tertiary butyl catechol may be substituted for methylene blue.

This application is a continuation of copending application Serial No. 353,848, filed May 8, 1953, and now abandoned.

Since certain changes may be made in the above process without departing from the scope of the invention herein involved, it is intended that all matter contained in the above description, or shown in the accompanying flow sheet, shall be interpreted as illustrative and not in a limiting sense.

What is claimed is:

1. A process for the production of methacrylates which comprises the steps of oxidizing isobutylene glycol with a nitric acid solution having a nitric acid concentration in excess of 50%, said nitric acid being used in at least the stoichiometric amount required to selectively oxidize the primary hydroxyl group to form alpha hydroxyisobutyric acid, esterifying said alpha hydroxyisobutyric acid with a primary aliphatic alcohol to form the corresponding ester and dehydrating the ester to form the methacrylate.

2. A process for the production of methacrylic acid which comprises the steps of oxidizing isobutylene glycol with nitric acid solution having a nitric acid concentration in excess of 50%, said nitric acid being used in at least the stoichiometric amount required to selectively oxidize the primary hydroxyl group to form alpha hydroxyisobutyric acid, and dehydrating said acid to form methacrylic acid.

3. A process for the production of alpha hydroxyisobutyric acid which comprises oxidizing isobutylene glycol with a nitric acid solution having a nitric acid concentration in excess of 50%, said nitric acid being used in at least the stoichiometric amount required to selectively oxidize the primary hydroxyl group.

4. The process for the production of alpha hydroxyisobutyric acid which comprises oxidizing isobutylene glycol with a nitric acid solution having a nitric acid concentration in excess of 50%, said reaction being carried out in the presence of an oxidation catalyst, said nitric acid being used in at least the stoichiometric amount required to selectively oxidize the primary hydroxyl group, and isolating alpha hydroxyisobutyric acid from said reaction mixture.

5. The process for the production of alpha hydroxyisobutyric acid which comprises oxidizing isobutylene glycol with a nitric acid solution having a nitric acid concentration in excess of 50% in the presence of an oxidation initiator and an oxidation catalyst, said nitric acid being used in at least the stoichiometric amount required to selectively oxidize the primary hydroxyl group, and isolating alpha hydroxyisobutyric acid from said reaction mixture.

6. The process of claim 5 wherein said oxidation initiator is nitrogen dioxide ($NO_2$).

7. The process of claim 5 wherein said oxidation initiator is nitrogen dioxide ($NO_2$) which is generated by heating nitric acid in the presence of a small amount of oxidizable organic material which reduces the nitric acid to nitrogen dioxide.

8. The process of claim 5 wherein said oxidation catalyst comprises vanadium pentoxide.

9. The process of claim 5 wherein the nitric acid solution is an aqueous solution having a nitric acid concentration of about 70% by weight.

References Cited in the file of this patent

UNITED STATES PATENTS

| | | |
|---|---|---|
| 2,267,377 | Olin | Dec. 23, 1941 |
| 2,298,387 | Kenyon | Oct. 13, 1942 |
| 2,356,247 | Kirk et al. | Aug. 22, 1944 |
| 2,360,880 | Kropa | Oct. 24, 1944 |

OTHER REFERENCES

Klemenc: Chem. Abst. 42 (1948), 6221i.
Degering et al.: J. Am. Chem. Soc. 73 (1951), 848–9.
Groggins: "Unit Processes," 4th Ed. (1952), pp. 425–6.